May 7, 1963  J. H. GLOVER  3,088,905
METHOD OF AND APPARATUS FOR OXYGEN DETERMINATION
Filed Oct. 13, 1960
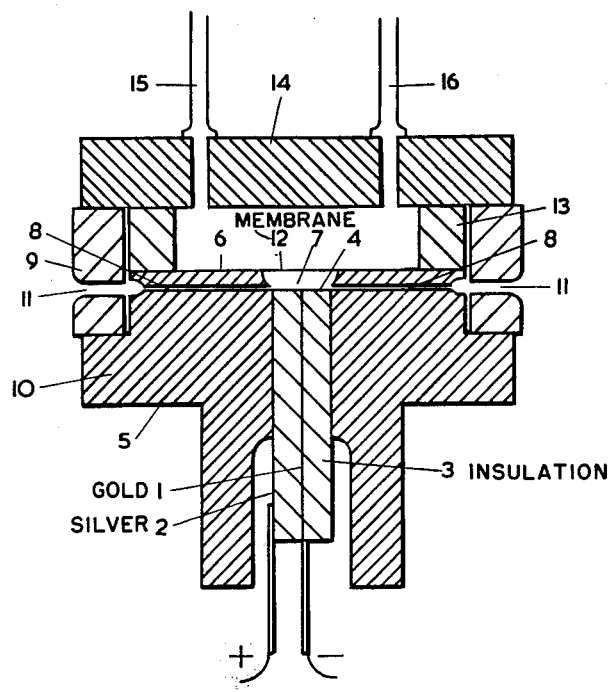
INVENTORS
Jack Harry Glover
BY
Aaron R. Townsend
ATTORNEY

United States Patent Office 3,088,905
Patented May 7, 1963

3,088,905
METHOD OF AND APPARATUS FOR OXYGEN DETERMINATION
Jack Harry Glover, London, England, assignor to The British Oxygen Company Limited, a British company
Filed Oct. 13, 1960, Ser. No. 62,375
Claims priority, application Great Britain Oct. 20, 1959
3 Claims. (Cl. 204—195)

This invention relates to a method of and apparatus for the determination of oxygen both in solution in an electrolyte and in admixture with another gas or gases and is an improvement in or modification of the method of and apparatus for oxygen determination described and claimed in my co-pending application Serial No. 813,972, filed May 18, 1959.

Application No. 813,972 describes and claims a method of determining the concentration of oxygen in solution in an electrolyte, comprising charging a pair of electrodes in contact with the electrolyte to a predetermined potential, interrupting said charging and measuring the fall of potential of the negatively-charged electrode after a predetermined time interval, which fall of potential is proportional to the concentration of oxygen in solution in the electrolyte.

It has been found that in certain cases, the electrodes, being in contact with the test solution, are affected by solution movement and may be affected by other constituents in the test solution, for example, proteins in blood, or metal ions in industrial solutions.

It is an object of the present invention to provide an electrode system which is not subject to these effects.

According to the invention, an electrode system for use in the method of determining the concentration of oxygen in solution in an electrolyte, described and claimed in application No. 813,972 comprises a silver tube adapted to act as the positively-charged electrode, and a wire of platinum or gold mounted co-axially within the silver tube and adapted to act as the negatively-charged electrode, the space between the inner wall of the tube and the wire being filled with electrically insulating material and adjacent ends of the tube and the wire being mounted in contact with a small body of oxygen-free electrolyte solution, separated from the test electrolyte solution containing oxygen by a membrane pervious to oxygen but impervious to deleterious constituents in the test solution.

One form of analysis cell incorporating an electrode system according to the invention is shown in side sectional elevation in the accompanying drawing.

Referring to the drawing, the negative electrode consisting of a platinum or gold wire 1 is fixed co-axially within a silver tube 2 acting as the positive electrode by means of an electrically insulating material 3, such, for example, as glass, filling the space between the wire 1 and tube 2. The whole thus forms a solid rod, one end of which 4 is ground flat.

This rod is mounted within a bore in a cylindrical body 5 which may conveniently be made of a transparent plastic material. One end 6 of the body 5 is provided with a central depression 7 into which the bore opens so that the ground end 4 of the rod forms the bottom of the depression 7. Holes 8 are provided in the body 5 connecting the depression 7 with the outer wall of the body 5, through which electrolyte solution can be injected into the depression 7. Leakage of electrolyte through these holes is prevented by an outer ring 9 rotating on the body 5 and supported on a flange 10 projecting from the body so that the ring 9 projects beyond the end 6 of the body 5. The ring 9 is provided with holes 11 which can be brought into register with the holes 8 for filling the depression 7 and thereafter brought out of register by rotating the ring 9 to prevent leakage of electrolyte from the depression.

The depression 7 is covered by a thin film 12 of a material pervious to oxygen, such as polyethylene, polytetrafluoroethylene, or rubber, the film 12 covering the end of the body 5 and being held in position by a retaining ring 13 fitting within the projecting part of the outer ring 9. The end 6 of the body 5 and the inner wall of the ring 13 constitute a container for the test solution, which is closed by a lid 14 resting on the rings 9 and 13 provided with inlet and outlet tubes 15 and 16 respectively.

In operation, the depression 7 is filled with an oxygen-free electrolyte by injection through the holes 11 and 8 which are in register and the holes 8 then closed by rotation of the outer ring 9. The electrodes 1 and 2 are then connected to a suitable electrical supply and the test solution containing oxygen is passed through the cell by means of the inlet and outlet tubes 15 and 16. Oxygen diffuses rapidly through the film 12 and reaches equilibrium with the electrolyte in the depression 7 in contact with the electrodes 1 and 2.

The cell illustrated in the drawing may also be used for the determination of oxygen in a gaseous atmosphere by removing the lid and suspending the cell within the atmosphere so that the latter is in contact with the surface of the film 12.

In a particular example of electrode system used for the determination of oxygen in a gaseous atmosphere, the negative electrode in the form of a platinum wire of diameter 0.003 in. was sealed into a piece of soda glass and the latter cemented into a silver tube of diameter 0.12 in. serving as the positive electrode. The depression 7 was 0.01 in. deep and was covered with a film of polytetrafluoroethylene 0.0005 in. thick. The depression 7 was filled with oxygen-free 0.05 M borax solution.

I claim:
1. An electrode system for use in the method of determining the concentration of oxygen in solution in an electrolyte, said electrode system comprising a cylindrical body portion, a silver tube forming a positively-charged electrode mounted within said body portion, a wire of a material selected from the group consisting of platinum and gold mounted co-axially within said silver tube and forming a negatively-charged electrode, an electrical insulating material filling the space between said positively-charged electrode and said negatively-charged electrode, a small body of oxygen-free electrolyte solution mounted in contact only with adjacent end faces of said tube, said wire, and said insulating material, and a membrane spaced from contact with said negative electrode to define a chamber for confining only said oxygen-free electrolyte and separating said oxygen-free electrolyte solution from the electrolyte solution containing oxygen in solution whose oxygen content is to be determined, said membrane being pervious to oxygen but impervious to deleterious constituents in said electrolyte solution containing oxygen in solution, ring means mounted on and surrounding said body portion for controlling the ingress and egress of said oxygen-free electrolyte solution from the chamber defined by said membrane and said electrode.

2. An electrode system according to claim 1 wherein said tube, said wire and said electrical insulating material together form a solid rod, one end of which is ground flat and forms the floor of a container for said body of oxygen-free electrolyte solution.

3. An electrode system according to claim 2 wherein said solid rod is mounted within a vertical bore in a cylindrical body, the upper end of said bore constituting the container for said body of oxygen-free electrolyte solution.

References Cited in the file of this patent

UNITED STATES PATENTS

| | | |
|---|---|---|
| 2,215,213 | Ellis | Sept. 17, 1940 |
| 2,786,021 | Marsh | Mar. 19, 1957 |
| 2,805,191 | Hersch | Sept. 3, 1957 |
| 2,913,386 | Clark | Nov. 17, 1959 |
| 2,969,058 | Parton | Jan. 24, 1961 |
| 3,000,805 | Carritt et al. | Sept. 19, 1961 |
| 3,022,241 | Jessop | Feb. 20, 1962 |